(12) United States Patent
Cho (10) Patent No.: US 6,348,913 B1
(45) Date of Patent: Feb. 19, 2002

(54) Z-AXIS MODULE FOR COMPUTER INPUT DEVICE

(75) Inventor: Tim Cho, Taipei (TW)

(73) Assignee: Kye Systems Corp. (TW)

( * ) Notice: Subject to any disclaimer, the term of this patent is extended or adjusted under 35 U.S.C. 154(b) by 0 days.

(21) Appl. No.: 09/338,860

(22) Filed: Jun. 23, 1999

(30) Foreign Application Priority Data

Jul. 7, 1998 (TW) ...................................... 87210862 U (51) Int. Cl.[7] .................................................. G09G 5/08
(52) U.S. Cl. ...................................................... 345/163
(58) Field of Search ................................ 345/163, 164, 345/165, 167, 156, 157

(56) References Cited

U.S. PATENT DOCUMENTS

| | | |
|---|---|---|
| 5,530,455 A | 6/1996 | Gillick et al. |
| 5,657,051 A | 8/1997 | Liao |
| 5,808,568 A | 9/1998 | Wu |
| 5,912,661 A * | 6/1999 | Siddiqui ...................... 345/163 |
| 5,952,997 A * | 9/1999 | Hu .............................. 345/163 |
| 6,064,370 A * | 5/2000 | Wang et al. ................. 345/163 |
| 6,097,371 A * | 8/2000 | Siddiqui et al. ............ 345/163 |

* cited by examiner

*Primary Examiner*—Richard Hjerpe
*Assistant Examiner*—Ronald Laneau
(74) *Attorney, Agent, or Firm*—Raymond Sun (57) ABSTRACT

A finger-operated module is incorporated for use with an input device. The finger-operated module has a base having a plurality of walls coupled to each other to define an interior space, a wheel fitted inside interior space and extending through the housing for manipulation by a user, and a resilient element positioned between the wheel and the base. The wheel can be coupled to the base for vertical reciprocating movement inside the interior space when the base is stationary. The resilient element can also be positioned along an imaginary center line that extends through the center of the resilient element and the center of the wheel.

19 Claims, 7 Drawing Sheets

Z-AXIS MODULE FOR COMPUTER INPUT DEVICE

BACKGROUND OF THE INVENTION

1. Field of the Invention

The present invention relates generally to computer input devices, and in particular, to a Z-axis module for use in a computer input device.

2. Background Art

Computer input devices, such as mice, track balls, touch pads and others, are not only designed to work with application software and to coordinate X-Y plane movements, but to also provide "click" functions for allowing the user to select onscreen displays. However, in order to scroll a screen, an input device must be pointed to the scrolling bar of the screen display. Therefore, the cursor of the input device must be repeatedly positioned between the working area of the area an the side scrolling bar, which is very inconvenient to the user. Further, to select files or application software that are not currently displayed on the screen, the user must "hide" the present file and then use the push buttons or keys of the input device to sequentially change the sub-directory with repeated "double-clicks". This process can be quite tedious and boring.

To overcome the drawbacks of and to simplify the operations described above, attempts have been made to provide computer input devices with another dimension of input, which has been referred to as "Z-axis" control. For example, U.S. Pat. Nos. 5,530,455 and 5,657,051 illustrate how a computer input device cooperates with software to provide improved operation where a screen can be scrolled, or any application software selected, regardless of the location of the cursor.

Figure 1:
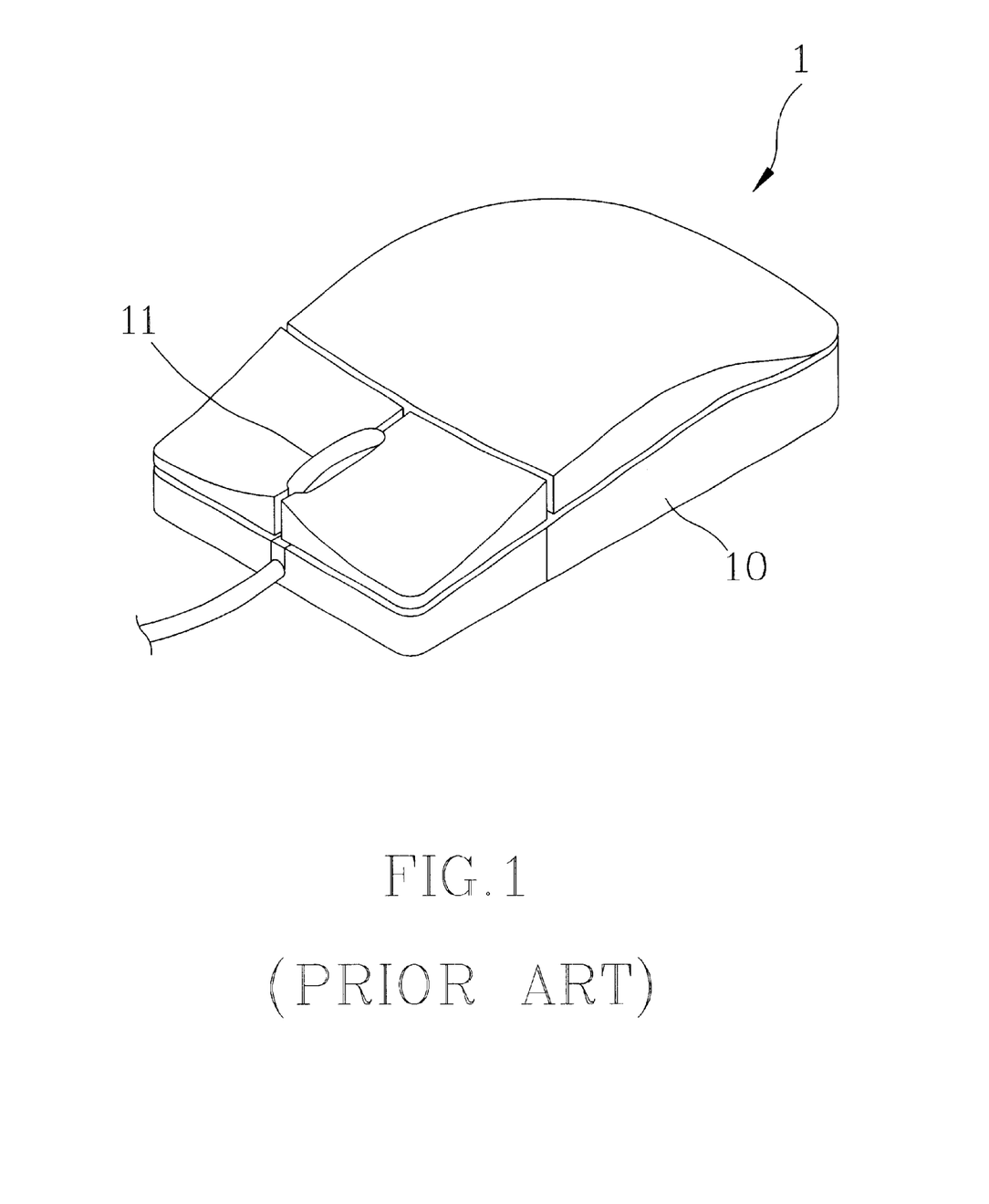
FIG. 1 is a perspective view of a conventional multi-dimensional computer mouse.

In many instances, this Z-axis control has been embodied in the form of a wheel-type Z-axis button. For example, FIG. 1 illustrates a conventional multi-dimensional computer mouse 1 having a wheel-type Z-axis button 12 positioned between two selection buttons 11, with a portion of the Z-axis button 12 exposed and protruding from the upper housing of the mouse 1.

Unfortunately, most of the conventional Z-axis devices suffer from several drawbacks. First, these Z-axis devices incorporate many tiny parts and components, thereby making assembly very difficult, often necessitating a variety of manufacturing processes and materials in organizing these parts for assembly.

Second, conventional Z-axis devices usually provide an additional (second) PC board to move with the Z-axis device so as to maintain the alignment between the light-receiving sensors and the notches or grooves of a rotating grating wheel when the Z-axis button is clicked (i.e., pressed to exert a downward force). However, the space and wiring requirements introduced by a second PC board inevitably complicate the design of the Z-axis module, and the assembly of the input device.

Third, conventional Z-axis devices usually have a resilient element that biases the Z-axis button against the downward force. This resilient element is usually installed in a manner in which it is offset from the center of the Z-axis device. This is illustrated in U.S. Pat. No. 5,808,568 (Wu), in which the resilient member or spring 15 is offset from the center of the Z-axis button 13. Therefore, depressing the Z-axis button will result in lateral movement of the resilient element, which hinders the operation of the Z-axis device.

Thus, there remains a need for a Z-axis device that overcomes the disadvantages set forth above, while retaining all functions that can be performed by conventional Z-axis devices.

SUMMARY OF THE INVENTION

The objects of the present invention can be accomplished by providing a finger-operated module for use with an input device. The finger-operated module has a base having a plurality of walls coupled to each other to define an interior space, a wheel fitted inside interior space and extending through the housing for manipulation by a user, and a resilient element positioned between the wheel and the base.

In one embodiment of the present invention, the wheel is coupled to the base for vertical reciprocating movement inside the interior space when the base is stationary.

According to another embodiment of the present invention, the resilient element is positioned along an imaginary center line that extends through the center of the resilient element and the center of the wheel.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

Figure 2:
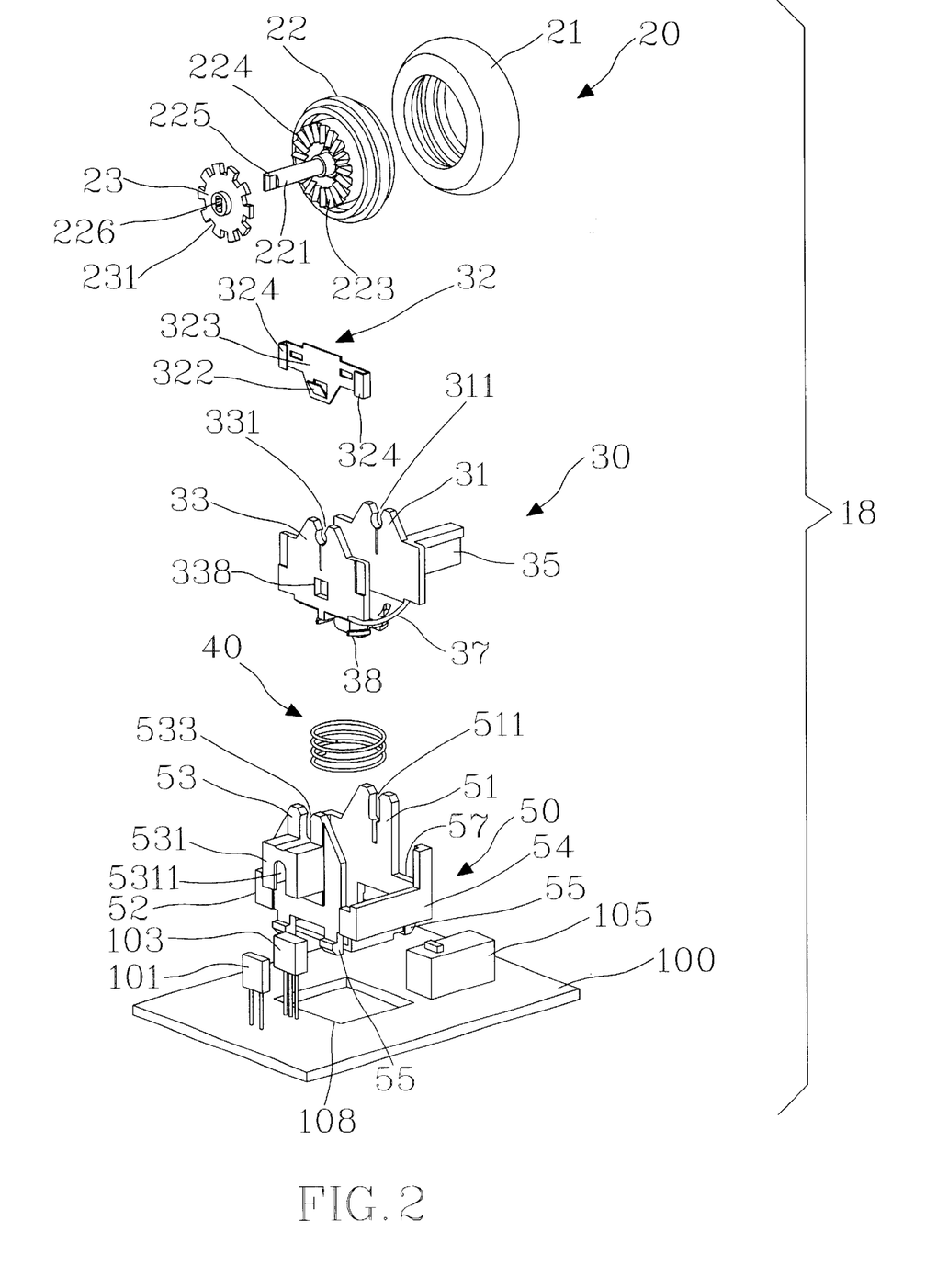
FIG. 2 is an exploded perspective view of one embodiment of a Z-axis module according to the present invention.
Figure 3:
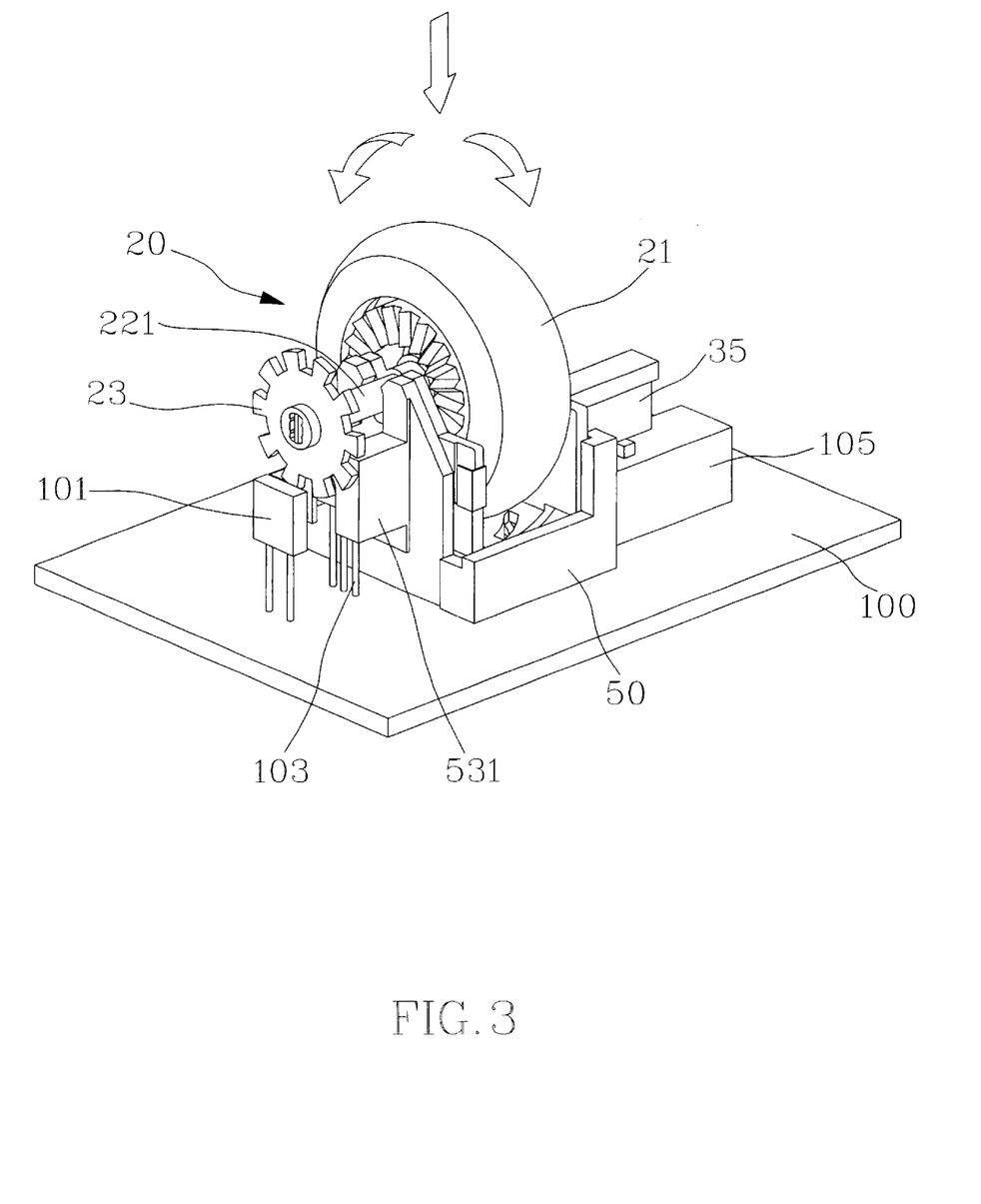
FIG. 3 is an assembled perspective view of the Z-axis module of FIG. 2.

The present invention provides a Z-axis module, illustrated in greater detail in FIGS. 2 and 3, that can be utilized in a computer input device. The computer input device can be a mouse (as shown in FIG. 1), a track ball device, a touch pad device, or any other input device. The Z-axis module of FIGS. 2 and 3 can be installed inside the housing of the input device with a portion of the Z-axis button or wheel exposed and extending from the housing, such as illustrated in FIG. 1.

Referring now to FIGS. 2 and 3, the Z-axis module 18 of the present invention includes four basic components: a wheel set 20, a frame 30, a resilient member 40, and a base 50.

The wheel set 20 includes a vertically-mounted wheel 22 that provides rotational input for the Z-axis module of the present invention. The wheel 22 has a shaft 221 that extends horizontally through the center of the wheel 22 and out through both lateral sides of the wheel 22. The rim of the wheel 22 can be covered or surrounded by a friction ring 21. The friction ring 21 can be formed of a soft material, such as soft rubber, so as to make it easier for the user to rotate the wheel 22. An angle division structure 223 can be provided on one lateral surface of the wheel 22. The angle division structure 223 can be embodied in the form of a planar gear as shown in FIG. 2 having a plurality of teeth 224, with each tooth 224 aligned with a corresponding radial line of the wheel 22. In one embodiment of the present invention, the wheel 22, the shaft 221 and the angle division structure 223 are provide in one integrated piece.

Figure 2A:
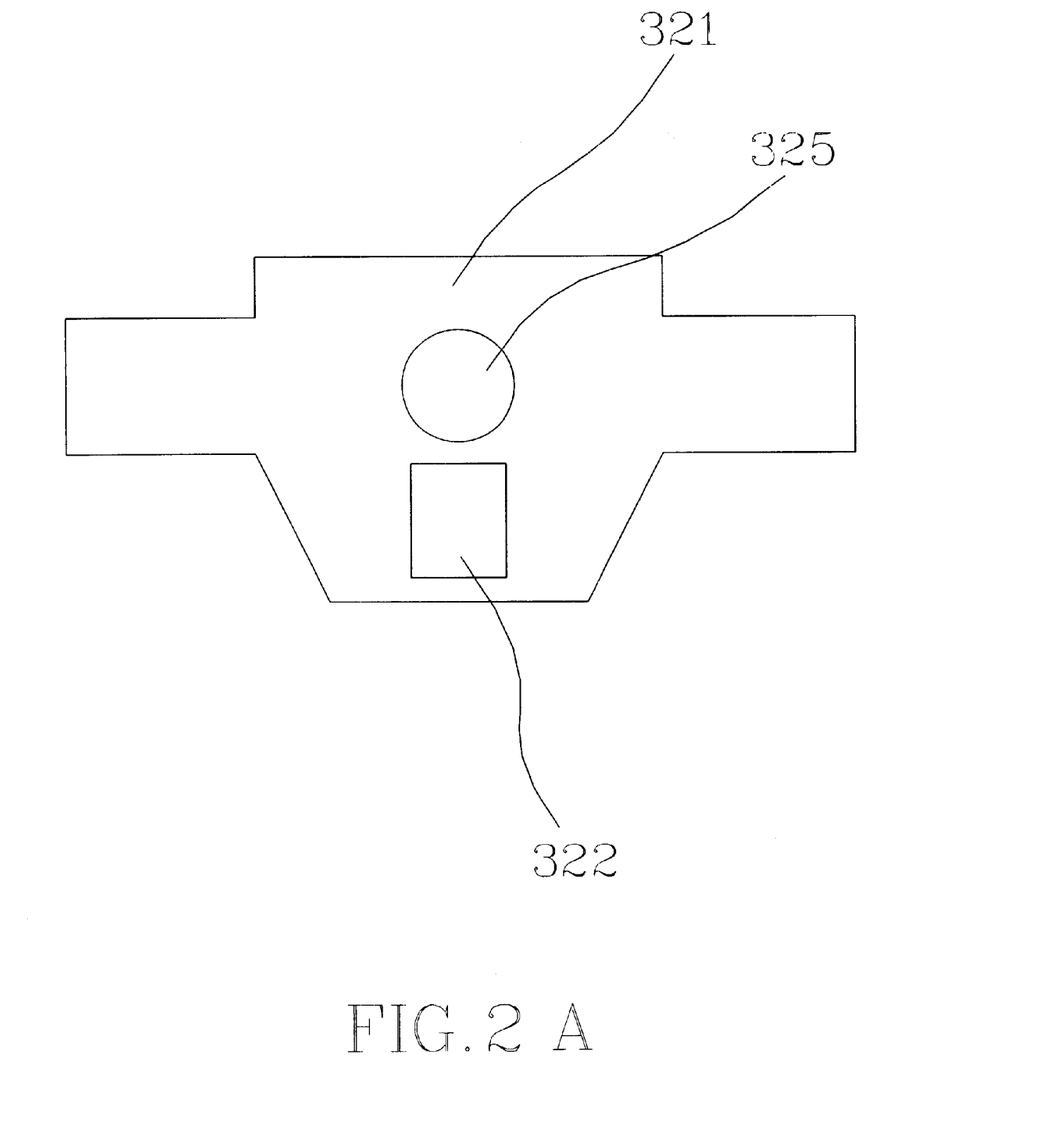
FIG. 2A is a rear plan view of a contact element that can be used with the Z-axis module of FIG. 2.

In addition, a contact element 32 is fitted between the teeth 224 and a side wall 33 of the frame 30, as described in greater detail below. Referring also to FIG. 2A, the contact element 32 has a first protrusion 325 extending from its inner surface 321 that is adapted to engage each corresponding tooth 224 as the wheel 22 is rotated, so as to cause the first protrusion 325 (i.e., the contact element 32) to intermittently engage or "catch" the wheel 22 as the wheel 22 is being rotated. This provides specific angular displacements of the wheel 22 during rotation thereof. The contact element 32 also includes a second angled protrusion 322 that extends from its outer surface 323, as well as opposing wrap-around side walls 324.

A first outer end 225 of the shaft 221 carries a grating wheel 23, and in particular, the outer end 225 is narrowed and is adapted to be received inside a slot or opening 226 in the center of the grating wheel 23. The grating wheel 23 includes a plurality of cut-out grooves or notches 231, each of which is adapted to allow light to pass therethrough to be received by a sensing element provided in a receiver 101 that is mounted on a PC board 100. As explained in greater detail below, a straight-line path is defined from a light emitting element 103 via one of the notches 231 to the sensing element in the receiver 101, so that rotation of the grating wheel 23 causes the light emitted from light emitting element 103 to the sensing element to be intermittently interrupted by the grating wheel 23. The length of the shaft 221 is preferably of a sufficient length so that the grating wheel 23 carried thereon extends past the confines of the frame 30 and the base 50 (as described below) to be positioned between the receiver 101 and the light emitting element 103, as shown in FIG. 3. In one embodiment of the present invention, the wheel 22 (including the shaft 221 and angle division structure 223), the friction ring 21 and the grating wheel 23 are provided in one integrated piece as a wheel set 20, with the rotational center of the wheel set 20 being the axis defined by the shaft 221 with control or force exerted through the friction ring 21.

The frame 30 has a generally circular lower depression portion or wall 37 and opposing first and second side walls 31 and 33, respectively, that together define an interior space for receiving and retaining the contact element 32, and wheel 22 and its friction ring 21. First and second pivot holes 311 and 331, respectively, are provided in the first and second side walls 31 and 33, respectively, for receiving opposing ends (such as 225) of the shaft 221 for rotation therein. A generally cylindrical wall 38 extends vertically downwardly from the bottom of the depression wall 37 and is adapted to receive and retain the spring 40, as explained in greater detail below. The frame 30 also includes an arm 35 that extends outside the confines of the base 50 and is positioned over a selection switch 105 that is provided on the PC board 100. When the Z-axis module is not used, the arm 35 does not contact the switch 105. However, when a downward force is exerted on the wheel 22 during use, the frame 30 is lowered, causing the arm 35 to contact the switch 105 to synchronically trigger the switch 105. Although FIG. 2 shows that the arm 35 extends from the first side wall 31, the arm 35 can extend from either side wall 31 or 33 as long as the switch 105 is positioned on the PC board 100 in a manner that the arm 35 and the switch 105 will be aligned in use.

The base 50 is adapted to be mounted on the PC board 100. The base 50 has a first external wall 51, a second external wall 53, a third external wall 52, and a fourth external wall 54 that together define an interior space for receiving and retaining the frame 30 and the wheel 22. The walls 51, 52, 53, 54 also define a housing for the base 50 in which the frame 30 can be vertically reciprocated therewithin. Latches 55 can be provided at the bottom of certain walls (e.g., the first and second walls 51 and 53 as shown in FIG. 2) for latching onto the PC board 100 to mount the base 50 on to the PC board 100. The first external wall 51 and second external wall 53 are adapted to be positioned parallel to, and external to, the first and second side walls 31 and 33, respectively, of the frame 30. First and second elongated pivot slots 511 and 533, respectively, are provided in the first and second walls 51 and 53, respectively, and are adapted to be aligned with the pivot holes 311 and 331, respectively, of the frame 30 for receiving opposing ends (such as 225) of the shaft 221 for rotation therein. The pivot slots 511 and 533 are elongated (i.e., longer than pivot holes 311 and 331) to allow vertical reciprocating movement of the shaft 221 inside these slots 511 and 533. For example, the lower extremity of the elongated pivot slots 511 and 533 can be lower than the lower extremity of the pivot holes 311 and 331 to allow the shaft 221 to move up and down inside the elongated pivot slots 511 and 533.

A photoshield 531 can extend from the external surface of the second wall 53. The photoshield 531 has a vertical slot 5311 to allow light to pass from inside the photoshield 531 to the outside. The photoshield 531 is preferably positioned so that it is below the shaft 221 with the vertical slot 5311 positioned below the shaft 221, and with the grating wheel 23 extending beyond the photoshield 531 so that the grating wheel 23 rotates about the vertical slot 5311 in a manner where the notches 231 are intermittently aligned with the vertical slot 5311. In one embodiment of the present invention, the base 50 and photoshield 531 are provided in one integrated piece. In addition, an opening 57 is provided in the first wall 51 for allowing the arm 35 to extend therethrough and out of the confines of the walls 51, 52, 53 and 54.

The spring 40 is seated inside the interior space of the walls 51, 52, 53, 54 of the base 50 and retained by the cylindrical wall 38 of the frame 30, and functions to provide balanced resilience to the Z-axis module whenever a force is exerted on the wheel 22 and the frame 30. As explained above, an imaginary center line of the spring 40 extends vertically through the center of the wheel 22, thereby avoiding lateral o side movement of the frame 30 when the frame 30 is moving in a reciprocating up-down manner inside the interior space of the walls 51, 52, 53, 54 of the base 50. As a result, any communication (i.e., light transmission) errors between the light emitting element 103 and receiver 101 are minimized.

Thus, the Z-axis module 18 of the present invention is adapted to be mounted on to the PC board 100 of a computer input device. First, the contact element 32 is fitted inside the frame 30 by sliding the wrap-around side walls 324 around the ends of the side wall 33 of the frame 30, and inserting the angled protrusion 322 through an opening 338 in the side wall 33 of the frame. Then, the wheel set 20 is fitted inside the frame 30 by snap-fitting the shaft 221 into the pivot holes 311 and 331. The base 50 can be mounted to the PC board 100 by latching the latches 55 into the periphery of an opening 108 on the PC board 100. When the base 50 is secured to the PC board 100, the photoshield 531 covers the light emitting element 103 to minimize the effects of photo-interference, but the slot 5311 allows light to be emitted from the light emitting element 103. The light emitting element 103 and the receiver 101 will have already been mounted on the PC board 100 in an aligned manner so that light emitted from the light emitting element 103 will be received in a straight-line path by the receiver 101. The spring 40 is retained inside the interior space of the walls 51, 52, 53, 54 of the base 50 and retained by the cylindrical wall 38 of the frame 30. The frame 30 is fitted inside the interior space of the walls 51, 52, 53, 54 of the base 50, with the arm 35 extending through the opening 57 to be positioned over the switch 105 on the PC board 100, and with the pivot holes 311 and 331 aligned with the slots 511 and 533, respectively.

When the Z-axis module 18 is in this assembled position (shown in FIG. 3), a part of the grating wheel 23 (i.e., its lower rim) extends in the path between the light emitting element 103 and the receiver 101, so that rotation of the grating wheel 23 will intermittently block the receipt of light at the receiver 101. The intermittent nature of the light blockage is caused by the protrusion 325 intermittently engaging different teeth 224 as the wheel 22 is being rotated. Therefore, the notches 231 in the lower rim of the grating wheel 23 allow for an "on-off" pattern of light reception at the receiver 101 when the grating wheel 23 is rotated. Rotation of the grating wheel 23 occurs when the wheel 22 is rotated, since both wheels 22 and 23 are coupled to the same shaft 221.

To use the Z-axis module 18 of the present invention, the user can either rotate the wheel 22, press the wheel 22 downwardly (i.e., exert a downward force on the wheel 22), or move the mouse. For example, when the user rotates the wheel 22 only (i.e., without pressing the wheel 22 or moving the mouse), the screen display or scrolling bar is scrolled upwardly or downwardly. As another example, when the user presses the wheel 22 downwardly only (i.e., without rotating the wheel 22 or moving the mouse), a "function window" appears on the computer screen. The "function window" includes several buttons, with each button representing a corresponding function which can be chosen by the user to execute that function. The function of scrolling the screen display is one of these functions. As yet another example, when the user simultaneously presses the wheel 22 downwardly and moves the mouse (i.e., without rotating the wheel 22), the "function window" appears on the computer screen. After selecting the appropriate scrolling button from the "function window", the screen display or scrolling is scrolled by moving the mouse upwardly or downwardly.

When the user presses the wheel 22 (see arrows in FIG. 3), the wheel 22 exerts a downward force on the frame 30, causing the arm 35 to contact the switch 105 to trigger the switch 105.

The resiliency of the spring 40 pushes the frame 30 back upwardly.

As a result, the Z-axis module 18 of the present invention provides an important benefit in that it maintains the positional relationship between the grating wheel 23, the light emitting element 103 and the receiver 101, thereby minimizing any communication (i.e., light transmission) errors between the light emitting element 103 and the receiver 101. This is accomplished in two ways. First, the slots 511 and 533 in the base 50 limit movement of the wheel 22 and frame 30 to a reciprocating vertical movement (i.e., there is no lateral or side movement), so that the possible deviating movements of the grating wheel 23 will be similarly limited. This minimizes any undesirable movement deviation by the grating wheel 23. Second, by aligning the center line of the spring 40 with the center of the wheel 22, the spring 40 can provide a balanced resilience to minimize lateral forces and movements away from the center line.

Figure 4:
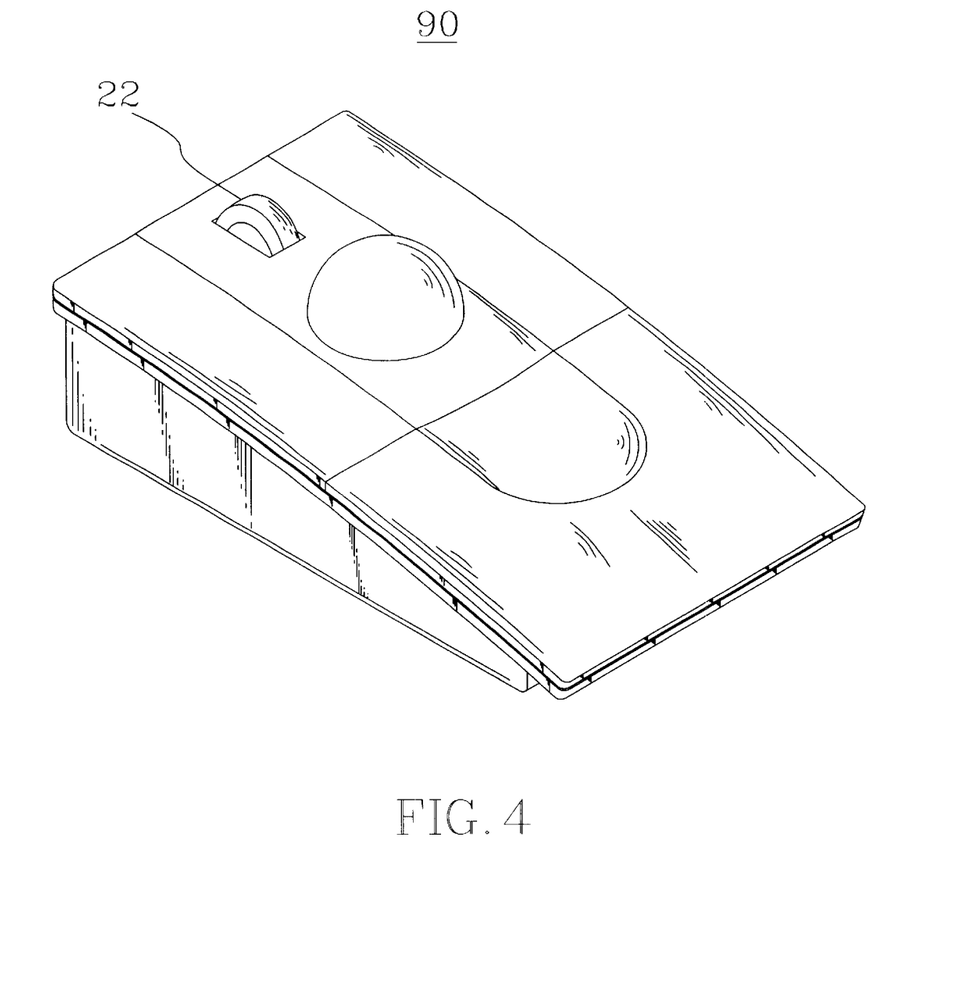
FIG. 4 is a perspective view of a track ball device that includes the Z-axis module of FIG. 2.
Figure 5:
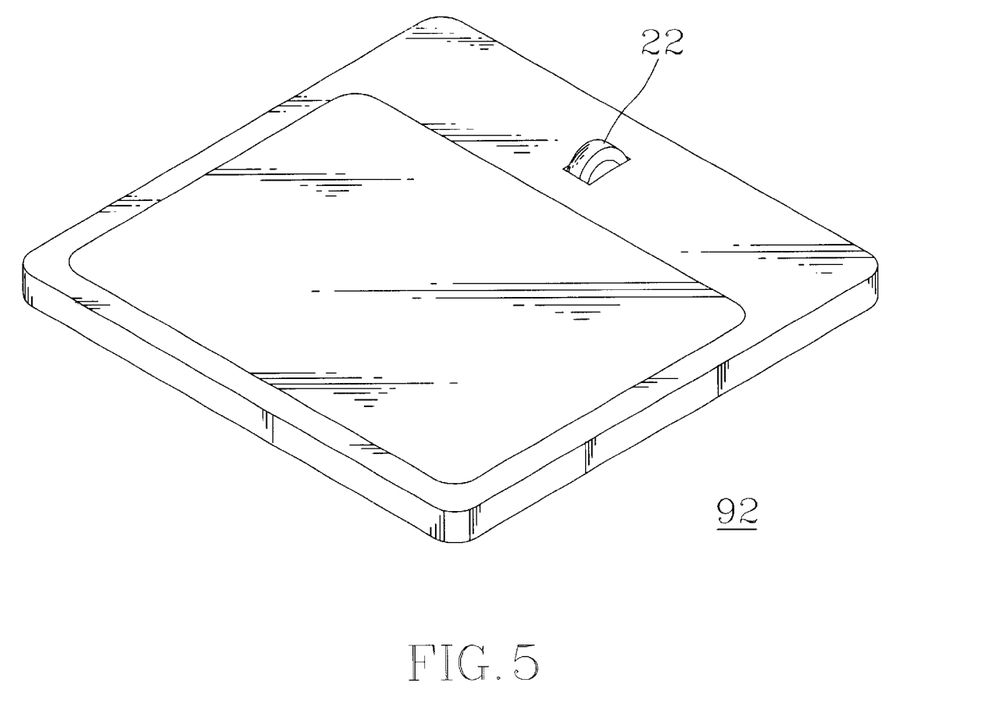
FIG. 5 is a perspective view of a tablet device that includes the Z-axis module of FIG. 2.
Figure 6:
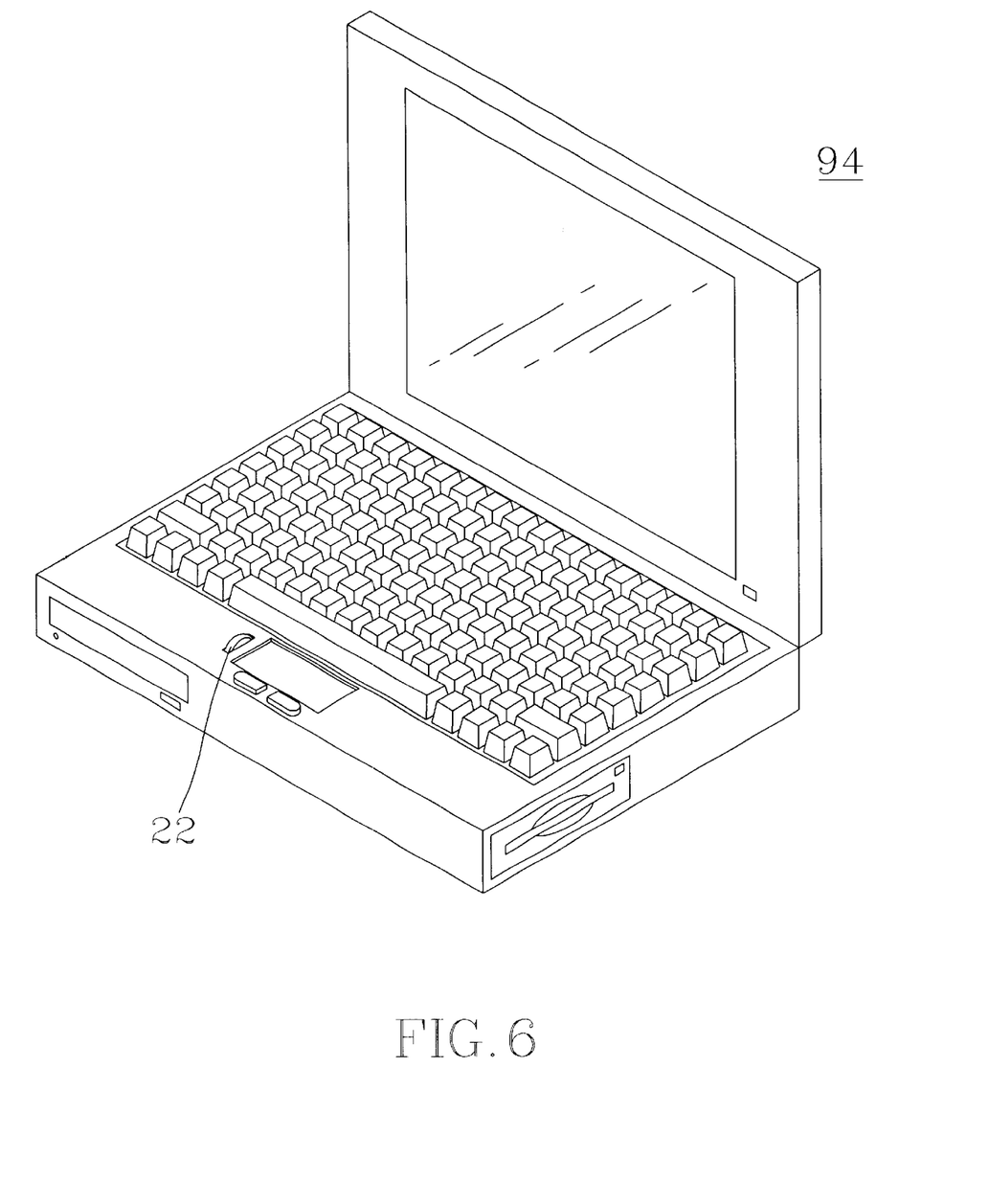
FIG. 6 is a perspective view of a notebook computer that includes the Z-axis module of FIG. 2.

As explained above, the Z-axis module 18 of FIGS. 2 and 3 can be installed inside the housing of the input device with a portion of the rim of the wheel 22 exposed and extending from the housing, such as illustrated in FIG. 1, with the exception that the button 12 in FIG. 1 can be the wheel 22 (and its friction ring 21). FIG. 1 illustrates a mouse, but the Z-axis module 18 of FIGS. 2 and 3 can be installed inside the housing of a track ball device or a touch pad or tablet device. For example, FIG. 4 illustrates a track ball device 90 with the Z-axis module 18 installed inside the track ball device 90, with a portion of the wheel 22 exposed and extending from the housing of the track ball device 90. As another example, FIG. 5 illustrates a tablet device 92 with the Z-axis module 18 installed inside the tablet device 92, with a portion of the wheel 22 exposed and extending from the housing of the tablet device 92. As yet another example, FIG. 6 illustrates a notebook computer 94 with the Z-axis module 18 installed inside notebook computer 94, with a portion of the wheel 22 exposed and extending from adjacent the keyboard of the notebook computer 94. The Z-axis module 18 can be installed inside the housing of the track ball device 90, tablet device 92, and notebook computer 94 using the same construction and principles illustrated in connection with FIGS. 2 and 3.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An input device having a housing and a finger-operated module, the finger-operated module comprising:

a base having a plurality of walls coupled to each other to define an interior space, with two of the plurality of walls defining a pair of parallel walls; and a wheel retained between the pair of parallel walls which facilitate vertical and non-lateral reciprocating movement of the wheel within the pair of parallel walls when the base is stationary, the wheel extending through the housing for manipulation by a user;

wherein the finger-operated module further includes a resilient element, and wherein the wheel and the resilient element each has a center, with the resilient element positioned between the wheel and the base along an imaginary center line that extends through the center of the resilient element and the center of the wheel.

2. The device of claim 1, wherein the finger-operated module further includes a frame that is fitted inside the interior space, with the frame supporting the wheel.

3. The device of claim 1, further including a PC board, with the base attached to the PC board.

4. The device of claim 2, wherein the frame has an arm, and wherein the finger-operated module further includes a PC board that has a switch that is contacted by the arm when the wheel is depressed.

5. The device of claim 1, wherein the wheel has a shaft that supports a grating wheel that extends outside the interior space.

6. The device of claim 5, wherein the finger-operated module further includes a PC board, with a light emitting element and a light receiving element positioned on the PC board, with the grating wheel positioned between the light emitting element and the light receiving element.

7. The device of claim 2, wherein the finger-operated module further includes a contact element having a protrusion, and the wheel has a plurality of teeth, with the protrusion intermittently engaging adjacent teeth of the plurality of teeth.

8. The device of claim 7, wherein the contact element is housed in the frame.

9. The device of claim 1, wherein the input device is a mouse.

10. The device of claim 1, wherein the input device is a track ball device.

11. The device of claim 1, wherein the input device is a tablet device.

12. An input device having a housing and a finger-operated module, the finger-operated module comprising:
   a base having a plurality of walls coupled to each other to define an interior space;
   a wheel having a center, the wheel fitted inside interior space and extending through the housing for manipulation by a user; and
   a resilient element having a center and positioned between the wheel and the base along an imaginary center line that extends through the center of the resilient element and the center of the wheel.

13. The device of claim 12, wherein the finger-operated module further includes a frame that is fitted inside the interior space, with the frame supporting the wheel.

14. The device of claim 12, further including a PC board, with the base attached to the PC board.

15. The device of claim 13, wherein the frame has an arm, and wherein the finger-operated module further includes a PC board that has a switch that is contacted by the arm when the wheel is depressed.

16. The device of claim 12, wherein the wheel has a shaft that supports a grating wheel that extends outside the interior space.

17. The device of claim 16, wherein the finger-operated module further includes a PC board, with a light emitting element and a light receiving element positioned on the PC board, with the grating wheel positioned between the light emitting element and the light receiving element.

18. The device of claim 13, wherein the finger-operated module further includes a contact element having a protrusion, and the wheel has a plurality of teeth, with the protrusion intermittently engaging adjacent teeth of the plurality of teeth.

19. The device of claim 18, wherein the contact element is housed in the frame.

* * * * *